J. NIELD.
AUTOMATIC COMPENSATOR FOR SCALES.
APPLICATION FILED DEC. 20, 1912.

1,133,657.

Patented Mar. 30, 1915.

UNITED STATES PATENT OFFICE.

JOSIAH NIELD, OF NORTH MILWAUKEE, WISCONSIN, ASSIGNOR, BY MESNE ASSIGNMENTS, TO W. & T. AVERY LTD., OF BIRMINGHAM, ENGLAND.

AUTOMATIC COMPENSATOR FOR SCALES.

1,133,657.  Specification of Letters Patent.  Patented Mar. 30, 1915.

Application filed December 20, 1912. Serial No. 737,820.

*To all whom it may concern:*

Be it known that I, JOSIAH NIELD, a subject of the King of England, and resident of North Milwaukee, in the county of Milwaukee and State of Wisconsin, have invented new and useful Improvements in Automatic Compensators for Scales, of which the following is a description, reference being had to the accompanying drawings, which are a part of this specification.

This invention relates to automatic scales for weighing grain and the like materials and has for its object to provide mechanism for automatically compensating for the weight of the grain which is in suspense or which is falling at the time the supply is shut off. Heretofore compensation for the weight of the grain in suspense at the time the feed gate closes has been made by means of a weight adjustably mounted on the weighbeam to cause the weighbeam to swing before the weighing hopper contains the full weight for which the scale is set, the amount of deficiency in weight of the contents of the weighing hopper being the computed weight of the grain in suspense at the time the feed gate is closed. This method of compensation necessitates a readjustment of the compensating weight whenever a change is made in the grain being weighed because of the change in the specific gravity of the grain. As readjustment of the compensating jockey weight may be overlooked or improperly made with resulting error in the weighing, it is desirable to provide a compensating means which will vary the degree of compensation automatically. With this end in view the present invention provides for supplementing the weight of the contents of the weighing hopper with the weight of a measure of the grain being weighed, the capacity of the measure being approximately equal to the amount of grain in suspension at the closing of the feed gate and such measure being automatically emptied at the beginning of the next weighing operation and refilled with the grain being weighed.

With the above and other objects in view the invention consists in the automatic compensator for scales as herein claimed and all equivalents.

Figure 1:
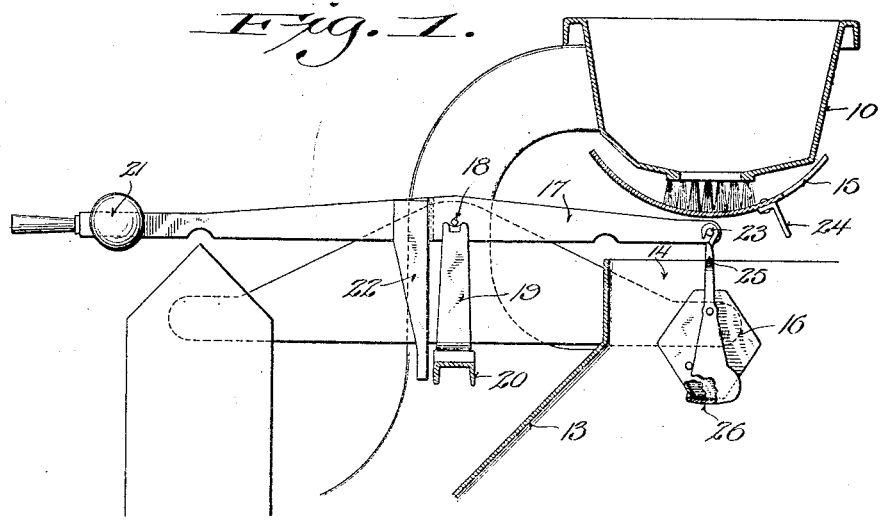
Figure 2:
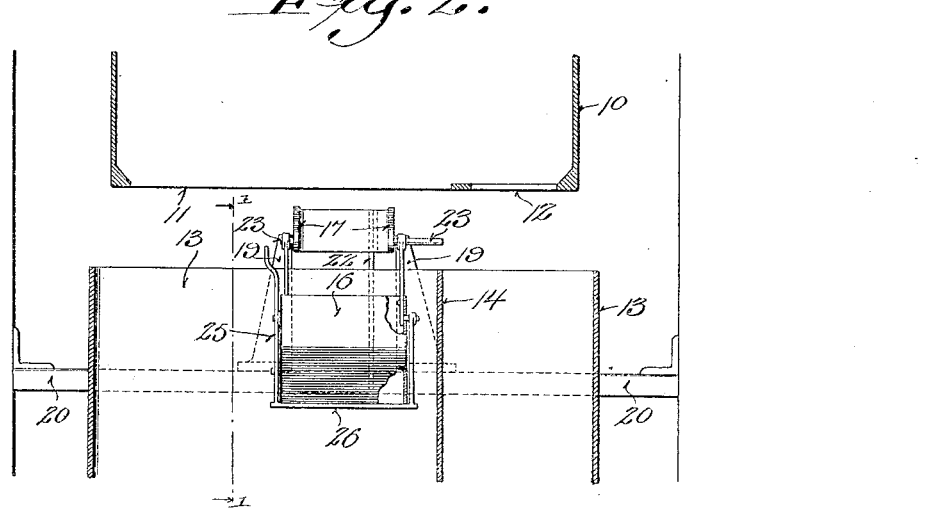

Referring to the accompanying drawings in which like characters of reference indicate the same parts in different views: Figure 1 is a side elevation of an automatic compensator constructed in accordance with this invention with parts of the scale mechanism with which it coöperates; and Fig. 2 is an end view thereof.

In these drawings 10 indicates a feed hopper provided as usual with a large main feed opening 11 and a smaller dribble feed opening 12. Beneath the feed hopper is the weighing hopper 13 which contains a partition 14 dividing it into a main feed compartment receiving grain from the main feed opening 11 of the feed hopper and a smaller dribble feed compartment receiving the grain from the dribble feed opening 12 of the feed hopper. A feed gate 15 is provided for controlling the flow of grain from the feed hopper as usual and depends in its operation upon the movements of the weighbeam which supports the weighing hopper so that when the contents of the weighing hopper approximate the weight for which the scale is set the feed gate 15 closes the main feed opening and the remainder of the grain is discharged through the dribble feed opening into the small compartment of the weighing hopper, until the final movement of the weighbeam causes the feed gate to close the dribble opening also.

A small bucket 16 is suspended at the mouth of the weighing hopper in the path of the flow of grain from the main feed opening of the feed hopper by means of a lever 17 which is fulcrumed by means of knife edges 18 bearing on brackets 19 on a fixed part of the scale frame 20 and a weight 21 adjustably positioned at the other end of the lever 17 serves to counterbalance the weight of the empty bucket 16. An arm 22 projecting downwardly from the lever 17 engages the frame 20 to limit the upward movement of the bucket when it is emptied in the manner which will be later described. The bucket 16 being positioned in the path of the main feed of the grain is quickly filled with the grain being weighed and the weight of the grain in the bucket is added to the weight of the grain in the weighing hopper to cause the weighbeam to move earlier than it would otherwise do. This is accomplished by means of a pin 23 projecting from the lever 17 adapted to engage the partition 14 of the weighing hopper.

When the weighbeam is moved by the weight of the contents of the weighing hopper plus the weight of the contents of the bucket so as to close the main feed opening of the feed hopper, grain continues to flow through the dribble opening into the small compartment of the weighing hopper until the full weight for which the scale is set is reached, whereupon the feed gate 15 is closed entirely and the weighing hopper is discharged without, however, discharging the contents of the bucket which is withheld from the weighing as offsetting or compensating for the weight of the grain in suspension at the time the feed gate was closed.

When the weighing hopper has been discharged and the feed gate is moved to again open the supply of grain to the weighing hopper for another weighing a projection 24 on the feed gate 15 engages the upper end of a lever 25 on the bucket 16 and causes said lever to swing and open the door 26 of the bucket to permit its contents to empty into the weighing hopper. The door of the bucket closes by its own weight when the bucket is empty and the lever 25 is released by the projection 24 and it is refilled by the grain being weighed so that in each weighing the compensation for the grain in suspension when the feed gate closes is made by means of the weight of a measure or sample of the same grain that is being weighed.

The object of separating the two feeds in the weighing hopper is to insure that the height of the grain in the smaller compartment at the completion of the weighing shall be in proportion to the specific gravity of the grain that is being weighed, and shall be unaffected if the machine is set to discharge a greater or smaller quantity than the normal. As the height of grain in the small compartment is in proportion to the specific gravity it follows that the height of the column of grain in suspense at the final cutoff will also be in proportion to the specific gravity of the grain. Without a compensating means of any kind, the accuracy of the weigh is affected by the weight of the column of grain in suspense at the final cutoff and by the impact thereof. The first will make the weighing heavy because the amount in suspense at the final cutoff immediately afterward falls into the hopper. The second will make the weighing light, as the impact will cause the weighbeam to move earlier. In practice the first is always greater than the second and in consequence the weighings would always be heavy if there were no compensating arrangement. With the present compensator the pressure exerted by the bucket upon the weighing hopper depends upon the weight of its contents, and as the volume of the bucket is constant the weight of its contents varies directly as the specific gravity of the grain that is being weighed at the time. Though the weighing is affected by the weight of grain in suspense and the impact of same as above mentioned, both of these are in proportion to the specific gravity of the grain because they depend upon the sectional area of the column which is constant, the height of the column which is proportional to the specific gravity of the grain owing to the separate compartments for the dribble, and the specific gravity of the grain. Therefore the weight of the contents of the bucket, which varies directly with the specific gravity of the grain being weighed, will, if the bucket is suitably designed, compensate for the weight of the grain in suspense at the final cutoff and also for the impact of same, both of which vary in proportion to the specific gravity of the grain.

The weight of the contents of the bucket varies in absolutely the same ratio as the specific gravity of the grain, but the amount to be compensated does not vary in exactly that ratio because it is also affected by the height of the column and by the impact, both of which, however, in turn depend upon the specific gravity. In order to alter the ratio of the contents of the bucket the weight 21 at the back of the lever 17 is adjusted until it more than balances the empty box, the exact amount to be ascertained by experiment.

What I claim as new and desire to secure by Letters Patent is:

1. A compensator for automatic grain scales and the like, comprising a bucket operatively constructed to engage and be supported when filled with grain upon a portion of the weighing hopper of the scale, said bucket positioned in the path of the grain to said weighing hopper to be filled with the grain being weighed and having a capacity approximately equal to the column of grain in suspense at the time the supply is shut off, the weight of the contents of the bucket being borne by the weighing hopper of the scale when said bucket engages said weighing hopper.

2. A compensator for automatic grain scales and the like, comprising a bucket operatively constructed to engage and be supported when filled with grain upon a portion of the weighing hopper of the scale, said bucket positioned in the path of the grain to said weighing hopper to be filled with the grain being weighed and having a capacity approximately equal to the column of grain in suspense at the time the supply is shut off, the weight of the contents of the bucket being borne by the weighing hopper of the scale when said bucket engages said weighing hopper, and means for emptying the bucket at the commencement of the succeeding weighing operation so that the bucket may be refilled afresh with the grain being weighed.

3. A compensator for automatic grain scales and the like, comprising a bucket positioned in the path of the grain to the weighing hopper of the scale to be filled with the grain being weighed and having a capacity approximately equal to the column of grain in suspense at the time the supply is shut off, and a suitably fulcrumed lever from which the bucket is suspended and by which the weight of the empty bucket is counterbalanced and adapted to engage the weighing hopper of the scale to impose the weight of the contents of the bucket upon said weighing hopper.

4. A compensator for automatic grain scales and the like, comprising a bucket positioned in the path of the grain to the weighing hopper of the scale to be filled with the grain being weighed and having a capacity approximately equal to the column of grain in suspense at the time the supply is shut off, a suitably fulcrumed lever from which the bucket is suspended and by which the weight of the empty bucket is counterbalanced, adapted to engage the weighing hopper of the scale to impose the weight of the contents of the bucket upon said weighing hopper, and a swinging door for the bucket adapted to be engaged by the feed gate of the scale on the opening movement thereof for discharging the contents of the bucket at the commencement of a weighing operation so that the bucket may be refilled with the grain being weighed.

5. A compensator for automatic grain scales and the like, comprising a bucket positioned in the path of the grain to the weighing hopper of the scale to be filled with the grain being weighed and having a capacity approximately equal to the column of grain in suspense at the time the supply is shut off, a suitably fulcrumed lever from which the bucket is suspended adapted to engage the weighing hopper of the scale to impose the weight of the contents of the bucket upon said weighing hopper, and a weight adjustably mounted on the lever to counterbalance the weight of the empty bucket.

6. A compensator for automatic grain scales and the like having a feed hopper with a main feed and a dribble feed, a partition across the weighing hopper dividing it into separate compartments for the main feed and the dribble feed, a bucket positioned in the path of the main feed and adapted to be filled with the grain being weighed and having a capacity approximately equal to the column of grain of the dribble feed in suspense at the time the dribble feed is shut off.

In testimony whereof, I affix my signature, in presence of two witnesses.

JOSIAH NIELD.

Witnesses:
R. S. C. CALDWELL,
KATHERINE HOLT.

Copies of this patent may be obtained for five cents each, by addressing the "Commissioner of Patents, Washington, D. C."